United States Patent Office 3,140,271
Patented July 7, 1964

3,140,271
PRODUCTION OF FORMALDEHYDE POLYMERS
William P. Gage, Scarsdale, N.Y., and Fred Jaffe, Silver Spring, Md., assignors to W. R. Grace & Co., New York, N.Y., a corporation of Connecticut
No Drawing. Filed Oct. 21, 1960, Ser. No. 63,983
3 Claims. (Cl. 260—67)

This invention relates to polymeric materials and more particularly to a method of preparing tough high molecular weight linear formaldehyde polymers or copolymers of formaldehyde with certain epoxides in the presence of a novel catalyst. Either formaldehyde gas or trioxane as a trimer may be used as a formaldehyde source.

Trioxane is a cyclic trimer of formaldehyde having a six membered heterocyclic ring consisting of alternating oxygen atoms and methylene groups. Pure trioxane melts at 64° C. and boils at a temperature of about 115° C.

We have found that suitable polymers of formaldehyde can be prepared by using certain hydrazinium compounds as catalysts. A greatly superior polymer can be prepared by the copolymerization of trioxane and certain epoxides in the presence of these catalysts.

Our method for the preparation of these polymers differs with the physical state of the formaldehyde being used in the polymerization. Thus if a purified formaldehyde gas is used, the formaldehyde is diluted with nitrogen gas and passed through a suitable solvent containing the hydrazinium compounds and, if desired, an antioxidant. The polymer is removed from the solution by filtration and is then treated to improve stability, etc.

When trioxane is used in preparation of the polymer, the freshly distilled trioxane is added to a tube and heated above the melting point of trioxane in a suitable bath. The hydrazinium catalyst is added and polymerization allowed to continue to completion. If an epoxide copolymer is to be prepared the epoxide, such as propylene oxide, for example, is added with the molten trioxane along with a suitable amount of our novel catalyst. The reactants are maintained at an elevated temperature for a period of time sufficient for the reaction to be completed and the solid polymers are recovered.

The polymers of my invention are defined as having a certain minimum degree of "toughness" or a certain minimum thermal stability. Degree of toughness is determined by subjecting a film from 3 to 8 mils in thickness to a series of manual creasing actions. A single crease cycle consists of folding the film through 180° and creasing and then folding in the reverse direction through 360° and creasing. The number of creasing cycles the film withstands before breaking is known as the degree of "toughness." Thus a film that cannot stand one complete cycle has a degree of toughness of 0. If it breaks on the sixth cycle, for example, it has a degree of toughness of 5.

In the description of this invention, the property of thermal stability is defined by the value of the rate constant for thermal degradation at 222° C. The degradation reaction is assumed to be a first order reaction which can be expressed mathematically by the differentiation equation:

$$-\frac{DW}{DT} = KW$$

where

T is the time from the beginning of decomposition,
K is the rate constant for the equation.

If a material had a thermal stability such that the value of K were greater than 1% per minute, the material would be considered too unstable to have any value as a polymer material. The value of this rate constant K for thermal degradation at 222° C. was determined using the syringe stability test. In this test, the number of ml. of gas evolved per gram of polymer for each five minutes of elapsed time at 222° C. is measured and the results converted to give a value of the rate constant K. The stability of the sample is determined by heating a sample of the polymer, weighed to the nearest milligram, to 222° C. in a hypodermic syringe and observing the position of the syringe piston at five minute intervals after the beginning of the test. A 50 ml. syringe is preferred for making the test. The syringe is cleaned and the polymer, in the form of a pressed pellet, is weighed and placed in the syringe. The syringe is lubricated between the piston and cylinder with a high quality inert oil or grease material. The syringe is evacuated and filled with nitrogen several times. Silicone oil is drawn into the syringe and ejected until about 5 ml. remains. The oil surrounding the polymer pellet serves as a means for expelling all gases before the test and as a heat transfer medium during the test. The nozzle of the syringe is then sealed and the syringe placed in a vapor bath at 222° C. The vapor bath may be vapors of methyl salicylate. The position of the syringe piston is noted at five minute intervals after the syringe is first placed in the vapor bath. The test may be continued for periods of 30 minutes or more and the position of the syringe piston over each five minute period determined. The change in position over the heating period determines the amount of gas evolved in the test and thus the amount of polymer degraded to monomer.

The thermal degradation of the trioxane-epoxide copolymers generally follows that predicted for a first order reaction. The data collected in the syringe stability test is converted to give the rate constant for thermal degradation K (222) using the equation:

$$K_{222} = \frac{\text{volume of gas evolved in ml. in time } T \times 0.0736}{\text{time T in minutes} \times \text{initial weight of the polymer sample in grams}}$$

The factor 0.0736 is a constant calculated on the assumption that the gas evolved is monomeric formaldehyde and that it follows the gas law as an ideal gas. A $K_{222}$ value of 1 in reciprocal minutes is equivalent to 1% degradation per minute.

Although crude polymers have a high thermal stability without treatment, the stability may be improved by further treatment. The crude product is dissolved in a suitable solvent such as dimethyl formamide or ethylene carbonate, for example, and small amounts of stabilizing materials are added to the polymer solution. After a short period of time the polymer is precipitated by suitable cooling methods such as pouring the solution into cold alcohol. The precipitated polymer is removed by filtration, washed and dried. Suitable products can be obtained by other types of treatment or stabilizing materials such as milling the material into the polymer, depositing the material from a volatile solvent, etc. A superior material is obtained from the copolymer by this treatment.

Distribution of the catalyst to insure good contact of the catalyst with the reactant is of course no problem where purified dry formaldehyde is being used as a source of formaldehyde for the polymerization. Where trioxane is being used for the polymerization, a more even distribution of the catalyst into the molten trioxane and comonomer, if one is being used, may be achieved by dissolving the catalyst in a suitable solvent and diluting to a standard volume. The correct amount of catalyst for addition to the reactor is then obtained by adding a portion of the diluted solution.

Stable hydrazinium salts suitable as catalysts in this reaction include those hydrazinium compounds having the structural formula

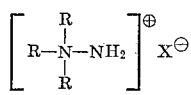

where R is an alkyl, alkoxy or polyalkoxy radical and X is an organic acid radical such as stearate, naphthenate, oleate, palmitate, acid phthalate or a strong inorganic acid radical such as bromide, chloride, borofluoride, etc. Examples of these hydrazinium salts include: N,N dimethyl-N-(hydro "tallow")hydrazinium naphthenate; N,N, bis (hydro "tallow")N methyl hydrazinium acid phthalate; N,N dimethyl-N(hydro "tallow") hydrazinium naphthenate; N,N-dimethyl-N-"coco" hydrazinium acid phthalate; N,N-dimethyl-N-hexadecyl hydrazinium naphthenate; N,N-dimethyl-N-dodecyl hydrazinium naphthenate; N,N-dimethyl-N-octadecyl hydrazinium acid phthalate; N,N - bis (hydro "tallow")-N-methyl hydrazinium oleate; N,N-bis-(hydro "tallow")-N-methyl hydrazinium palmitate; N,N-bis "coco"-N-methyl hydrazinium palmitate; N,N-bis "soya"-N-methyl hydrazinium oleate, etc.

The concentration of the catalyst used in the process of our invention is very important since the use of an excessive amount of catalyst may result in an unstable product, possible because the catalyst that initiates the polymerization also catalyzes degradation of the polymer. The catalyst concentration must be kept within the range of preferably 0.1 to 100 milligrams of catalyst per liter of solvent where a solvent is used. In bulk polymerization of trioxane alone or with the epoxide the catalyst must be present in an amount between $10^{-6}$ and $10^{-3}$ moles of catalyst per mole of trioxane. In general, a satisfactory product is obtained in bulk polymerization when the catalyst is present in a concentration of about $10^{-6}$ to $10^{-4}$ moles of catalyst per mole of trioxane.

The temperature used in carrying out the reaction varies with the formaldehyde source. Thus where formaldehyde gas is used the reaction can conveniently be carried out at rom temperature since the formaldehyde is diluted with nitrogen and passed through a solution containing the catalyst. It would not be convenient to carry out the reaction at room temperature where trioxane is being used since trioxane is solid at room temperature. It is thus convenient to carry out the reaction at a temperature between the melting point and boiling point of trioxane at atmospheric pressure. Thus the polymerization of trioxane alone or with an epoxide may be carried out at a temperature between 20 and 130° C. Best results are obtained at temperatures of about 60–80° C., when the copolymer with an epoxide is being formed. Although propylene oxide, for example, which boils at 35° C., is soluble in trioxane up to about 2% it would obviously tend to boil out of the solution at increased temperature unless the reaction were run at pressures slightly above atmospheric. In general, a temperature of about 30–100° C. gives a satisfactory product when trioxane is being used as a formaldehyde source.

Pressure is not critical but for reasons of economy and ease of operation we prefer to carry out the polymerization reaction at nearly atmospheric pressure whenever possible. Obviously advantages are derived from operating above atmospheric pressure when volatile epoxides are used since polymerization occurs in a liquid phase. In cases where the epoxide to be polymerized with trioxane has a boiling point below the reaction temperature, the reaction will obviously be run under pressure. The minimum pressure will be determined by the vapor pressure of the monomer solution at the temperature chosen for polymerization. The polymerization in the gas phase using gaseous formaldehyde with nitrogen diluent is run at pressure slightly above atmospheric.

A superior product is obtained when the copolymerization reaction is run in bulk. However, the reaction may be run with a solvent. Suitable solvents for the reaction include aliphatic hydrocarbons such as hexane, heptane, cyclohexane, etc.; aromatic hydrocarbons such as benzene, chlorobenzene, nitrobenzene and other inert aprotic organic solvents.

The polymerization time may vary over a relatively wide range. The polymerization of dry formaldehyde taeks place almost instantly and is normally completed within about five minutes after the formaldehyde is bubbled into the solution containing the initiator. The copolymerization of the epoxides and trioxane is normally completed in about 5–40 minutes. Thus the reaction may be run for periods of about 5 minutes to about 24 hours depending on the type of material being used for the formaldehyde source. Various epoxides may be used in preparing copolymers using our novel catalyst. Suitable epoxides include those falling within the general formula

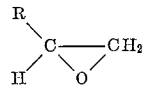

where R is hydrogen or an alkyl, aryl, aralkyl, alkaryl or epoxy cycloalkyl group. Substituents may be present in the R group. Suitable substituents include halogen, nitro, cyano, carbalkoxy or ether groups, etc.

The invention is further illustrated by the following illustrative but non-limiting examples.

*Example I*

Formaldehyde gas was dried and purified by pyrolyzing 120 g. of α polyoxymethylene under a flowing dry nitrogen stream and condensing and twice distilling the formaldehyde.

A gas reaction chamber was set up in a suitable flask equipped with a gas inlet and outlet port and a stirrer. A total of 1386 g. of cyclohexane were added to the flask along with 0.66 g. ($0.88 \times 10^{-3}$ moles) of 1,1-bis-perhydrotallow-1-methyl hydrazinium naphthenate and 0.11 g. of diphenylamine. The dry formaldehyde nitrogen stream was passed through this solution and the nitrogen evolved was allowed to escape through the exit port in the reaction vessel. The polymer formed immediately on contact with the cyclohexane solution containing the initiator. When all of the formaldehyde gas had been passed through the solution the polymer that had formed was washed with cyclohexane and acetone and then dried. A total of 15.5 g. of a spongy white solid which melted in the range of 169–170° C. was recovered. This solid was pressed into a film about 5 mils in thickness by pressing the material at 370° F. and 15,000 p.s.i. for a period of about 3 minutes. The film was aged at 107° C. for 14 days and the toughness of the film determined using the toughness test described above. The film had a degree of toughness of more than 100.

*Example II*

Dry formaldehyde gas was prepared by pyrolyzing 120 g. of α polyoxymethylene using the technique described in Example I. The gas phase reaction chamber was set up and 1238 g. of cyclohexane and 0.2 g. ($0.4 \times 10^{-3}$ moles) of the 1,1-bis-perhydrotallow-1-methyl hydrazinium naphthenate and 0.11 g. of diphenylamine were added. Formaldehyde gas was led into the reactor in a nitrogen diluent. The polymer formed immediately on contact of the formaldehyde gas with the cyclohexane solution containing the initiator. After all the formaldehyde had been added the polymer was recovered by filtration, washed and dried as before and a film was pressed from this material.

*Example III*

Dry formaldehyde gas was prepared by pyrolyzing 120 g. of polyoxymethylene under a flowing dry nitrogen stream and condensing the formaldehyde using the technique described in Example I. The gas phase reactor was set up and 1031 g. of cyclohexane, 0.12 g. diphenylamine and 0.5 g. (1×10⁻³ moles) of 1,1-bis-perhydrotallow - 1 - methyl hydrazinium naphthenate was added. The polymer formed almost immediately on contact of the formaldehyde with the solution containing the initiator. After all of the formaldehyde gas had been passed through the solution the reaction was stopped and the product was recovered, washed and dried using the technique set out in Example I. A total of 8 g. of a powdery product having a melting point of 165–170° C. was recovered from this reaction.

*Example IV*

Dry formaldehyde gas was prepared by pyrolyzing 100 g. of alpha polyoxymethylene using the technique described in Example I. The gas phase reaction chamber was set up and 1220 g. of cyclohexane, 0.2 g. of diphenylamine and 0.2 g. of N,N-bis(hydro "tallow")-N-methyl hydrazinium acid phthalate were added. Formaldehyde gas was led into the reactor in a nitrogen diluent. The polymerization of the formaldehyde gas occurred smoothly on contact with the cyclohexane solution containing the initiator. After all the formaldehyde had been added the polymer was recovered by filtration, washed and dried using the technique described in Example I. The reaction yielded 27 g. of a polymer which was pressed at 400° F. and 15,000 p.s.i. for 4 minutes. The film could be creased 100 times without breaking.

Obviously many modifications and variations of the invention as hereinabove set forth may be made without departing from the essence and scope thereof and only such limitations should be applied as are indicated in the appended claims.

What is claimed is:

1. A process for preparing a high molecular weight polymer of formaldehyde which comprises polymerizing formaldehyde under anhydrous conditions at a temperature between room temperature and 130° C. in an inert solvent in the presence of a hydrazinium catalyst having the general formula

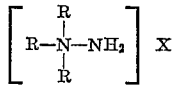

where R is an alkyl group having 1 to 14 carbon atoms and X is an organic acid radical selected from the group consisting of the stearate, the naphthenate, the oleate, the palmitate and the acid phthalate, said hydrazinium catalyst being present in the concentration of about 10⁻⁶ to 10⁻³ moles of catalyst per mole of formaldehyde, and recovering the polymer formed in the reaction.

2. A process for preparing a high molecular weight polymer of formaldehyde which comprises polymerizing formaldehyde gas under anhydrous conditions at a temperature of 20–130° C. in an inert solvent and an antioxidant in the presence of a hydrazinium catalyst having the general formula

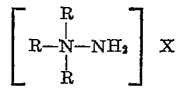

where R is an alkyl group having 1 to 14 carbon atoms and X is an organic acid radical selected from the group consisting of the stearate, the naphthenate, the oleate, the palmitate and the acid phthalate, said hydrazinium catalyst being present in the concentration of about 1×10⁻³ moles of catalyst per mole of formaldehyde, and recovering the polymer formed in the reaction.

3. A process for preparing a high molecular weight polymer of formaldehyde which comprises passing formaldehyde gas and nitrogen gas as a diluent under anhydrous conditions at a temperature of 20–130° C. into cyclohexane and diphenylamine in the presence of a hydrazinium catalyst having the general formula

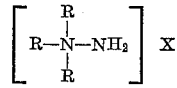

where R is an alkyl group having 1 to 14 carbon atoms and X is an organic acid radical selected from the group consisting of the stearate, the naphthenate, the oleate, the palmitate and the acid phthalate, said hydrazinium catalyst being present in the concentration of 1×10⁻³ moles of catalyst per mole of formaldehyde, and recovering the polymer formed in the reaction.

References Cited in the file of this patent

UNITED STATES PATENTS

| | | |
|---|---|---|
| 2,475,610 | Gresham et al. | July 12, 1949 |
| 2,841,570 | MacDonald | July 1, 1959 |
| 2,994,687 | Goodman et al. | Aug. 1, 1961 |
| 3,017,389 | Langsdorf et al. | Jan. 16, 1962 |